(12) United States Patent
Alsadiq et al.

(10) Patent No.: US 8,498,907 B1
(45) Date of Patent: Jul. 30, 2013

(54) METHOD, MEDIUM, AND SYSTEM FOR AN ONLINE TEXTBOOK EXCHANGE

(76) Inventors: Luai Ali Alsadiq, Malibu, CA (US);
Rafid Ali Alsadiq, Malibu, CA (US)

( * ) Notice: Subject to any disclaimer, the term of this patent is extended or adjusted under 35 U.S.C. 154(b) by 0 days.

(21) Appl. No.: 13/533,416

(22) Filed: Jun. 26, 2012

(51) Int. Cl.
*G06Q 30/00* (2012.01)

(52) U.S. Cl.
USPC ........................................ 705/27.1

(58) Field of Classification Search
USPC .............................. 705/26.1, 27.1
See application file for complete search history.

(56) References Cited

U.S. PATENT DOCUMENTS

| | | | |
|---|---|---|---|
| 7,877,315 | B2 | 1/2011 | Pickering |
| 2002/0077925 | A1 | 6/2002 | Fujita |
| 2003/0078856 | A1 | 4/2003 | Zubi |
| 2005/0038711 | A1 | 2/2005 | Marlelo |
| 2005/0102200 | A1* | 5/2005 | Carnes ........................ 705/27 |
| 2006/0029911 | A1 | 2/2006 | Monk et al. |
| 2007/0033112 | A1 | 2/2007 | Nagle, Jr. et al. |
| 2007/0088588 | A1 | 4/2007 | Schaffer |
| 2012/0030049 | A1 | 2/2012 | Jacobs et al. |

FOREIGN PATENT DOCUMENTS

KR 20040016348 2/2004

OTHER PUBLICATIONS

Fisher, Mary Jo, No more lengthy lines for books Campuses: Students are increasingly obtaining textbooks online, Aug. 25, 1999, Orange County Register, Santa Ana, California.*

* cited by examiner

*Primary Examiner* — Matthew Zimmerman
(74) *Attorney, Agent, or Firm* — Oblon, Spivak, McClelland, Maier & Neustadt, L.L.P.

(57) ABSTRACT

An online textbook exchange apparatus an associated methodology for receiving seller course material information from a seller including a first set of parameters and a course material survey, and generating a probability score. The online textbook exchange apparatus generates a course material profile containing the first set of parameters and the probability score and stores the course material profile in a memory. Buyer course material information is them received from a prospective buyer where the buyer course material information includes a second set of parameters. The online textbook exchange apparatus compares the one or more of the course material profiles to the second set of parameters and generates a set of comparison results. The one or more course material profiles and the respective probability score are then output to the prospective buyer based on the set of comparison results.

17 Claims, 7 Drawing Sheets

Exemplary Survey

1. How likely is the text book going to be used again?

A. *(100%)* Will be used for sure.
    B. *(66%)* Most likely to be used.
    C. *(50%)* Likely to be used.
    D. *(33%)* Not likely to be used.
    E. *(0%)* Will not be used.

2. How likely is the text book going to be used again?

A. *(100%)* Sure, older versions are never a problem.
    B. *(66%)* Most likely to allow an older version unless there is some drastic change.
    C. *(50%)* Likely to be accepted depending on the new contents.
    D. *(33%)* Not likely to accept as newer versions always have something important added.
    E. *(0%)* Will not accept older versions.

Figure 4

METHOD, MEDIUM, AND SYSTEM FOR AN ONLINE TEXTBOOK EXCHANGE

GRANT OF NON-EXCLUSIVE RIGHT

This application was prepared with financial support from the Saudi Arabian Cultural Mission, and in consideration therefore, the present inventor has granted The Kingdom of Saudi Arabia a non-exclusive right to practice the present invention.

BACKGROUND

1. Field of the Disclosure

This disclosure relates to an online textbook exchange apparatus, associated methodology, and non-transitory computer program storage device for helping students buy and sell course materials online.

2. Description of the Related Art

College or university students are typically required to buy certain textbooks and specific course materials for the courses that they are enrolled in. These textbooks and specific course materials can be bought either in new or used condition at various bookstores. In some cases, other students who have previously taken the course may sell their textbooks to the students about to take the course. Such used textbooks are typically advertised on bulletin boards or newspapers, neither of which are convenient since a student looking for these books must spend considerable time sorting through the bulletin boards and newspapers for the right information.

A student may also sell their used books and specific course materials over the Internet using a website. These websites allow the students to offer their used textbooks to other students. However, at this time, websites only allows students looking for used textbooks to perform limited searches of entire databases for these books using keywords such as the book's title, author, or ISBN number.

Even if a student finds the specific course material used in a previous term, there is no information available that informs a prospective buyer that the same course material will still be used in a subsequent term. Further, it may be unknown if a previous revision of the course material will be accepted in the subsequent term, especially if a new revision of the course material is released.

As there may be many students who wish to buy course materials from other students within the same school or geographical region, buying and selling course materials through a website and thus shipping the course materials to another student within the same school can be burdensome and an inefficient use of limited resources.

SUMMARY

In view of the above noted-noted deficiencies of conventional book search methods, the inventor recognizes that there is a need to conveniently associate used course materials to a specific course taught by a specific instructor within a specific school in order to allow students to find specific course materials more quickly.

The inventor further recognizes the need to provide information relating to the probability that a specific course material will be used in a subsequent term and, if there is a change in revision of the course material, the probability that an older revision will still be acceptable in the subsequent term.

The inventor further recognizes the need to provide a predetermined set of meeting locations for two students within the same school or geographical region to meet and complete a course material transaction instead of spending additional resources for shipping the course materials to another student located within a same or similar geographical region.

The present invention is directed to an online textbook exchange apparatus method and computer program storage device.

According to one exemplary embodiment, the online textbook exchange apparatus receives seller course material information from a seller including a first set of parameters and a course material survey from the seller which the online textbook exchange apparatus uses to generate a probability score. The online textbook exchange apparatus also generates a course material profile containing the first set of parameters and the probability score and stores the course material profile in a memory. Further, the online textbook exchange apparatus receives buyer course material information from a prospective buyer where the buyer course material information includes a second set of parameters. The one or more of the course material profiles containing the first set of parameters are compared to the second set of parameters to generate a set of comparison results. One or more course material profiles and the respective probability score are transmitted to the prospective buyer based on a set of comparison results.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and the exemplary depictions do not in any way limit the scope of the advancements embraced by the specification. The scope of the advancements embraced by the specification and drawings are defined by the words of the accompanying claims.

FIG. 4 illustrates the course material survey received from a seller according to an exemplary embodiment;

DETAILED DESCRIPTION OF THE EMBODIMENTS

Figure 1:
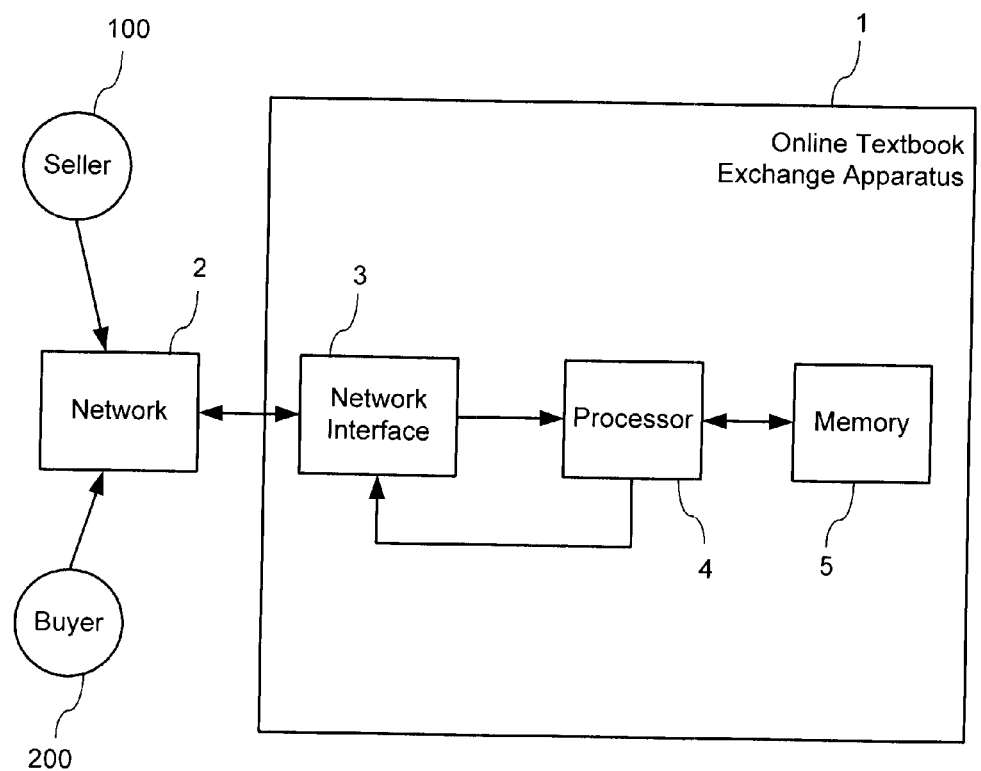
FIG. 1 is a schematic diagram of an online textbook exchange apparatus according to an exemplary embodiment.

While this disclosure may suggest many varied embodiments, there is shown in the drawings and will herein be described in specific exemplary embodiments, with the understanding that the present disclosure of such embodiments is to be considered as an example of the principles and not intended to limit the invention of the specific embodiments shown and described. In the description below, like reference numerals are used to describe the same, similar, or corresponding parts of the several views of the drawings.

FIG. 1 is a schematic diagram of an online textbook exchange apparatus 1 according to an exemplary embodiment. The online textbook exchange apparatus 1 includes a network interface 3 connectable to a network 2, a processor 4, and a memory 5. The network interface provides a wired or wireless connection to the network 2 in which a seller 100 or a prospective buyer 200 can connect. The network 2 can be any form of computer network such as a local area network or a wide area network, such as the Internet. The processor 4 receives information from the network interface 3 and stores information in the memory 5. The processor 4 also outputs information to the network 2 via the network interface 3.

Figure 2:
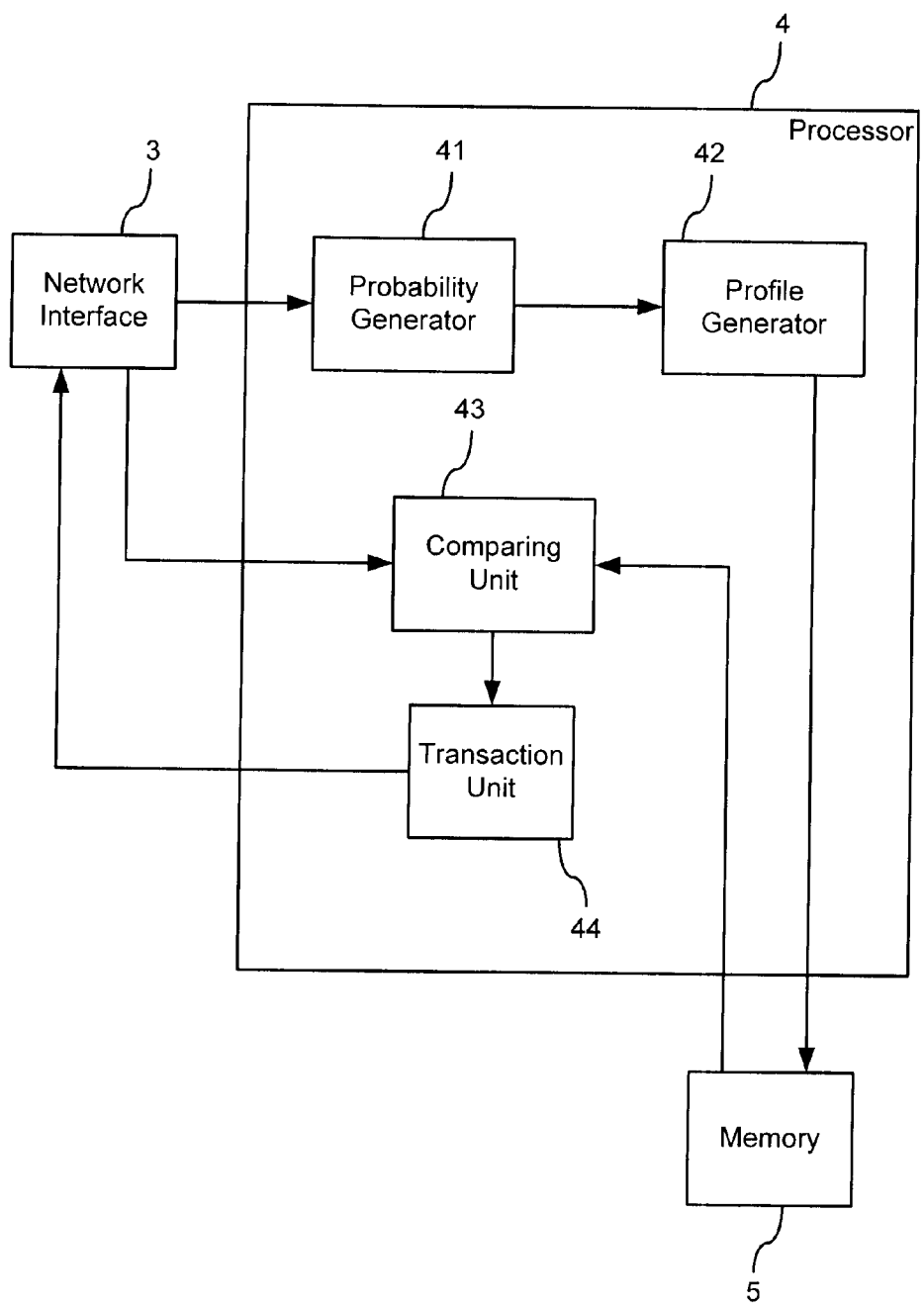
FIG. 2 illustrates the processor of an exemplary embodiment of the online textbook exchange apparatus according to an exemplary embodiment.

An exemplary processor 4 is illustrated in FIG. 2 and identifies functionality performed by the processor such as a probability generator 41, a profile generator 42, a comparing unit 43, and a transaction unit 44. The functionality of these units can be executed by the processor by executing instructions contained in the memory 5 or via other hardware circuitry. When a seller 100 connects to the online textbook exchange apparatus 1 via the network 2, and provides information regarding a course material the seller 100 wishes to sell, the probability generator 41 generates, via the processor 4, a probability based on the information received from the seller 100. The probability, hereinafter referred to as a probability score, can be computed to provide additional information about course materials being sold by the seller 100 such as a probability that the course materials will be acceptable by an instructor in a subsequent semester. The probability score generated by the probability generator 41 can be combined with other information, such as a school name, a course name, and an instructor name retrieved from the seller 100 to generate seller course material information at the profile generator 42. Additional information from the seller 100 may also be received such as a textbook name, a textbook revision, an ISBN, a textbook condition, a university name, a class name, an instructor name, and a major to generate additional seller course material information, which can be provided to the profile generator 42. The seller course material information is then output from the processor 4 and stored in the memory 5.

When a prospective buyer 200 connects to the online textbook exchange apparatus via the network 2, the processor 4 obtains buyer course material information, such as a school name, a course name, and an instructor name, to be used to find appropriate course material profiles that may be stored in the memory 5. The comparing unit 43 receives the buyer course material information from the prospective buyer 200 and then compares the received buyer course material information to one or more profiles containing seller course material information stored in the memory 5. The comparing unit 43 then generates a set of comparison results based on the comparison and outputs the results to the transaction unit 44. The comparison results may be based on any number of predetermined matching algorithms or filtering methods. In a non-limiting example, the comparing unit 43 will retrieve, from the memory 5, all of the course material profiles that contain course materials by a particular course instructor, specified by the prospective buyer 200, and which meet a predetermined probability score, specified by the prospective buyer 200, and output the retrieved course material profiles as comparison results to the transaction unit 44. For example, the buyer may wish to only obtain course materials that have a probability score of 80% or greater that the instructor will allow that course material in a future course. The transaction unit 44 outputs, to the network interface 3, the list of comparison results to the buyer 200 who then has the ability to selects appropriate course materials from the set of comparison results and completes the transaction.

In one exemplary embodiment, the online textbook exchange apparatus 1 can be implemented using a web server, such as Apache or IIS running Windows 2000 or Windows NT, which hosts a website. The web server can be developed using any appropriate form of web architecture and database language, such as MySQL. The website will also be compatible with one or more contemporary web browsers that are currently available.

Figure 3:
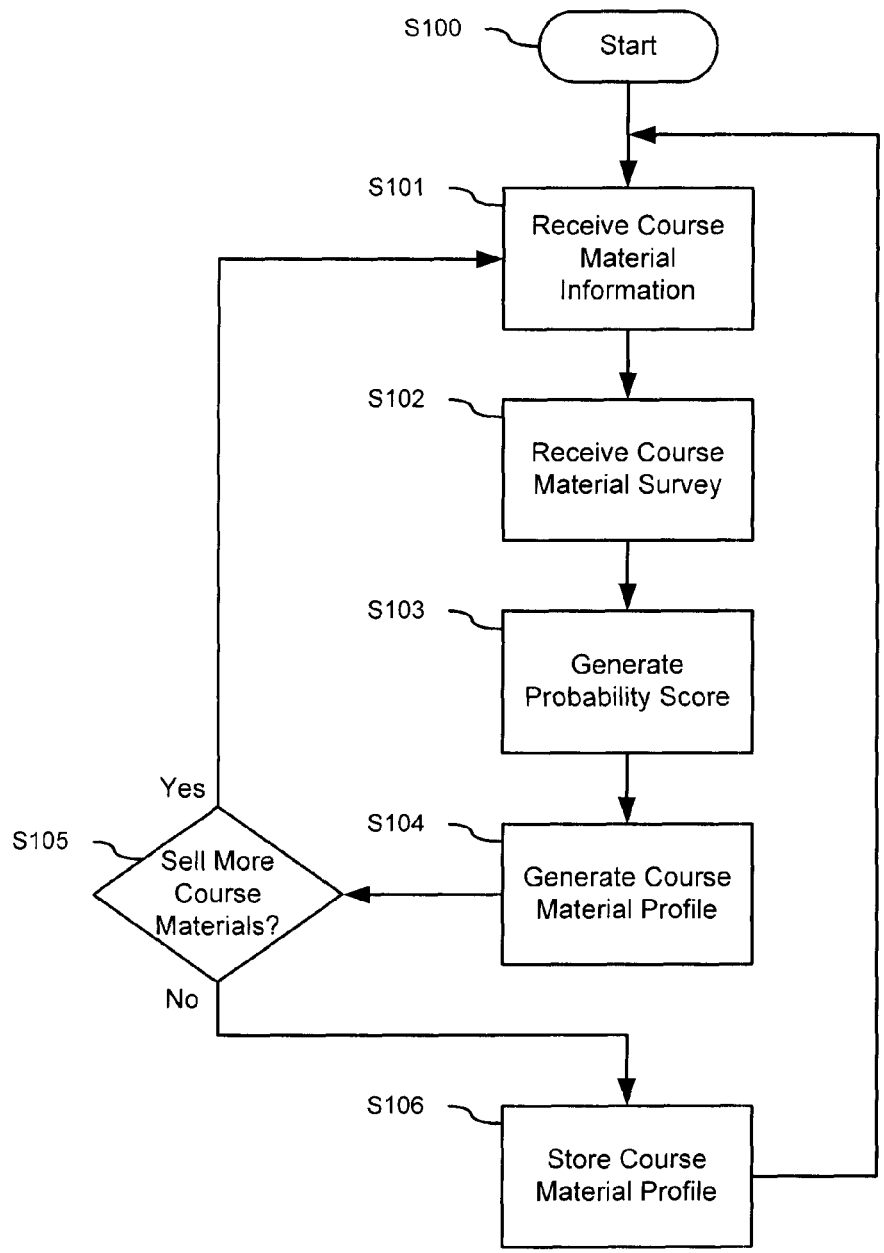
FIG. 3 is a flow diagram for generating a course material profile according to an exemplary embodiment.

An exemplary method for selling a course material via the online textbook apparatus is shown in FIG. 3. The steps for the method of selling a course material are performed by the processor 4 and based on information received by the seller 100. Initially, the online textbook exchange apparatus 1 waits for a seller to connect to the online textbook exchange apparatus 1, via the network 2, at step S100. Once a seller connects to the online textbook exchange apparatus 1 at step S101, the online textbook exchange apparatus 1 receives course material information from the seller. The results of a course material survey, which are based on information obtained from the course instructor via the seller 100, are also received from the seller 100 at step S102. At step S103, a probability score is generated based on the received course material information and course material survey to determine the probability that the course material will be acceptable in a subsequent semester. Once the course material information and a probability score are received, a course material profile is generated as step S104. The system then determines at step S105 if the seller has additional course materials to be sold. If additional course materials are to be sold at step S105, the system then re-performs the process starting at step S101 for the additional course materials. If additional course materials are not to be sold at step S105, the system then stores the generated course material profiles in the memory 5 at step S106 and then waits to receive additional course material information from another seller.

A non limiting example of the method for selling a course material, implemented via a website, is now discussed. When a seller 100 logs onto the website, the online textbook exchange apparatus 1 will receive from the seller 100, at step S101, a selection of the state in which his school is located. Once a state is selected, a list of schools within that selected state will be presented. The seller then selects the appropriate school in which the seller is attending based on the selected state and this information will be received by the online textbook exchange apparatus 1. Once a seller 100 specifies his particular school, the seller provides specific details about the course material he is selling such as the name of the course that the course material was used in and the name of the instructor who taught the course. Additional information can be provided by the seller 100 to include the seller's major, the title and author of the course material, the ISBN number of the course material, and the revision/version number of the course material. The above noted selections made by the seller 100, with respect to step S101, can be made by drop down menu, text input, touch screen selection, voice command, or any other input method as would be recognized by one of ordinary skill in the art.

Along with the information relating to the course material, a survey relating the likelihood that the course material will be used again in a subsequent term is also received at step S102. The answers to the course material survey may be obtained from sources such as, but not limited to, the course instructor, course descriptions, other students/users, or school catalog. Information from these sources are used by the seller 100 to complete the course material survey.

The probability score, generated by the probability generator 41, at step S103, is determined by receiving a course material survey, via the network interface 3, that has been completed by the seller 100 based on the previous discussion. An exemplary survey can contain any number of questions that are appropriate to the course material which the seller is attempting to sell. In a non-limiting example, if the seller is attempting to sell a textbook via the online textbook exchange apparatus 1, the survey may contain the following questions such as how likely is the textbook going to be used again and how likely a particular revision of the textbook is going to be used again. The responses to these questions can be multiple choice with each multiple choice selection adding a particular contribution to the overall probability score. An exemplary survey for selling a used textbook via the online textbook exchange apparatus is illustrated in FIG. 4.

As illustrated in FIG. 4, the survey presents a set of directed questions so as to determine the extent that the course material being sold will provide value to a prospective buyer. In one embodiment, the value is a computed probability score indicating the probability that the same course material being sold, via the online textbook exchange apparatus 1, will be used in a subsequent term and that a specified revision will be acceptable in a subsequent term is based on the survey as shown in FIG. 4. The survey can contain any number of questions that are appropriate to the course material which the seller is attempting to sell. In a non-limiting example, the survey may contain questions such as how likely is the textbook going to be used again. The responses to these questions can be multiple choice with each multiple choice selection adding a particular contribution to the overall probability score. When the seller answers the questions, the probability score is computed based on a predetermined algorithm such as, for example, the following equation:

$$(1+PS)^n = (1+p_1)(1+p_2) \ldots (1+p_n)$$

where PS is the probability score and p is a probability extracted from each of the respective question presented in the survey.

In order to generate the probability score as discussed above, the seller 100 may be presented with the exemplary survey shown in FIG. 4. Based on discussions with the course instructor or comments from other students/users as well as a review of course catalogs prepared by the school, the seller 100 may select answer C for question 1 and answer B for question 2. The extracted probabilities $p_1$ and $p_2$ would then be 0.50 and 0.66 respectively. Based on the above algorithm, with n equal to 2, the computed probability score, PS, would be 0.57 or 57%. This value provides a percentage likelihood of the expected value that the book will provide and can be used to make a more informed purchasing decision. Furthermore, this data can be stored over time to generate trending results that can be used as another input to the probability score calculation. For example, the frequency that a particular instructor switches to a new version of a course material or switches to a completely different course material can be tracked and inputted into the probability score algorithm. While the previously presented algorithm was presented for this example, other algorithms may be used to generate the probability score and may be customized based on the provided input. For example, certain questions may be weighted more heavily than others based on the perceived accuracy of the answers. Further, to ensure the validity of seller 100 responses to the survey, each seller, for example, may be ranked based on input received from other buyers 100 who have purchased from the seller 100 in the past. For example, the probability score may be higher in part based on a seller 100 having a higher rank therefore incentivising sellers 100 to be honest and use the online textbook exchange apparatus 1 as much as possible for their transactions.

Referring to FIG. 3, the course material information and the respective probability score are used to generate a course material profile, at step 104 via the profile generator 42, which associates the course material to a particular course, instructor, and school. The profile is generated by combining the school name, course name, and instructor name with the computed probability score. Additional information may also be stored in the profile based on the information provided by the seller 100 such as the seller's major, the title and author of the course material, the ISBN number of the course material, and the revision/version number of the course material. The seller 100 can also provide the quantity of course material to be sold, the condition of the course material to be sold, and the desired price of the course material to be sold. The condition of the course material can be placed in several categories such as like new, very good, good, and acceptable. The condition of the book can also be described by the seller 100 via a short description or the like. Further, the seller 100 can also upload an image of the course material to provide a visual description of the course material. The image of the course material can be obtained using any photographic device such as a standard camera or a cell phone camera. The image may also be a collection of images or a video of the course material. Once the seller 100 provides the appropriate information regarding the course material to be sold, the seller can then submit his course material profile so that his course materials can be posted on the online textbook exchange apparatus 1.

As illustrated in FIG. 3 at step S105, the process discussed above can be performed a plurality of times for each distinct course materials to be sold by the seller. Once a course material profile has been generated for each one of the plurality of course materials, the plurality of course materials are stored in the memory 5, at step S106, and the online textbook exchange apparatus 1 returns to an initial standby state.

Figure 5:
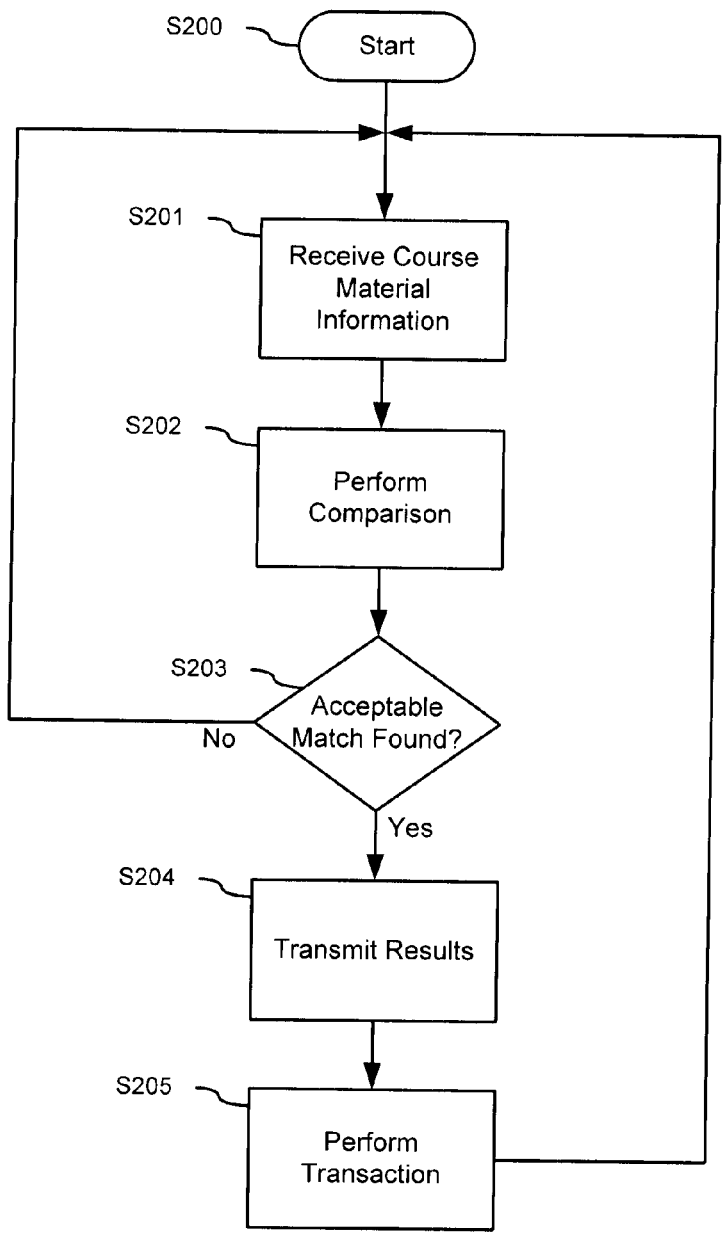
FIG. 5 is a flow diagram for performing a comparison based on buyer course material information according to an exemplary embodiment.

An exemplary method in which a prospective buyer can purchase course materials via the online textbook exchange apparatus is shown in FIG. 5. Initially the apparatus is standing by to receive input from a prospective buyer 200 via the network 3 at step S200. When the prospective buyer 200 logs on to the online textbook exchange apparatus 1 at step S201 the processor 4 receives buyer course material information from the prospective buyer via the network 2 and the network interface 3. Once buyer course material information is received, a comparison is performed by the processor 4 that compares the buyer course material information with the seller's course material information stored in memory 5 at step S202. If an acceptable match is found between the buyer course material information and the one or more selling course material information at step S203 the results are transmitted to the buyer at step S204. The buyer then selects an appropriate course material from the comparison results at step S205 and proceeds to complete the transaction at step S205. If an acceptable match is not found at step S203, the buyer is informed that no acceptable match was found.

A non limiting example of the method for buying a course material, implemented via the online textbook exchange apparatus 1, is now discussed. When a prospective buyer 200 logs on to the website, the online textbook exchange apparatus 1 receives at Step 201, from the prospective buyer 200, buyer course material information such as a school name, a course name, and an instructor name. Once buyer course material information is received from the prospective buyer 200, a set of comparison results is generated, at step 202 via the comparing unit 43, based on a comparison of the buyer course material information and the course material profiles containing seller course material information. The comparison results may be based on any number of predetermined matching algorithms or filtering methods. In this non-limiting example, the comparing unit 43 will retrieve, from the memory 5, all of the course material profiles that contain course materials by a particular course instructor, specified by the prospective buyer 200, and which meets a minimum probability score, also specified by the prospective buyer 200. If the comparison results contain one or more acceptable results at step S203, the online textbook exchange apparatus 1 transmits the one or more acceptable results to the buyer 200 at step 204. If no acceptable results were found at step 203, the online textbook exchange apparatus 1 returns to an initial standby state.

The transaction 44 unit outputs to the network 2, via the network interface 3, the comparison results and the associated probability score for each selected profiles to the prospective buyer at step S204. The comparison results can be presented in any form that is easy for the prospective buyer to navigate and understand, such as a ranked list. At step S205, the prospective buyer can then select a course material to add to the shopping cart for purchase based on his perception of the comparison results.

The prospective buyer can repeat this process for each distinct course material that is desired. The prospective buyer can also change the parameters for each comparison to be performed by the comparing unit 43 such as different probability score threshold for each distinct course material or look for course materials for a given course for a plurality of instructors.

Once a set of comparison results have been generated and transmitted to the transaction unit 44, prospective buyers can select any number of course materials they want to purchase from the comparison results and add them to an online shopping cart.

The online shopping cart will show the total price for each item along with a small product summary. Once the prospective buyer hits a submit button to check out, a consolidated order detail for all the products in the shopping cart is presented to the buyer. The buyer can add or remove any course material from the shopping cart at any time before checkout. In order to complete the transaction the shopping cart will be intricated with a gateway such as PayPal or Google Checkout, or any other form of online payment processing as would be recognized by one of ordinary skill in the art. Shipping options can also be presented.

Figure 6A:
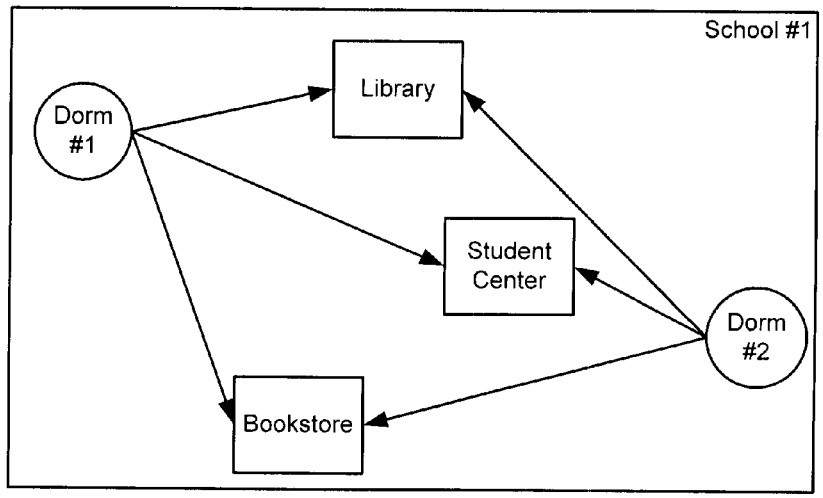
FIGS. 6A and 6B are diagrams of predetermined meeting locations according to an exemplary embodiment.

If the buyer and seller attend the same school, one option for completing the transaction may be to select a location within the school in which the buyer and seller can meet in person to complete the transaction as shown in FIG. 6A. Available locations can be generated based on received input from the school as well as received input from other students, buyers, and sellers. For example, if the seller currently lives in a first dormitory and the buyer lives in a second dormitory, then pre-identified locations based on distances between the first dormitory and the second dormitory may be identified such as the school library, the student center, or the campus bookstore. Pre-identified locations may be selected based on minimizing the distance that the seller 100 and the buyer 200 will have to travel. Furthermore, each of these locations may have user recommendation and feedback associated with them to inform others about the characteristics of each location such as ease of access or perceived safety. Once the buyer and seller meet at an agreed upon location, the buyer and seller will complete the transaction in person. The selected location can be selected based on an number of factors such as the location of the seller and prospective buyer, what time of day they wish to meet, how early/late a location is accessible, and the perceived safety of the meeting location.

Figure 6B:
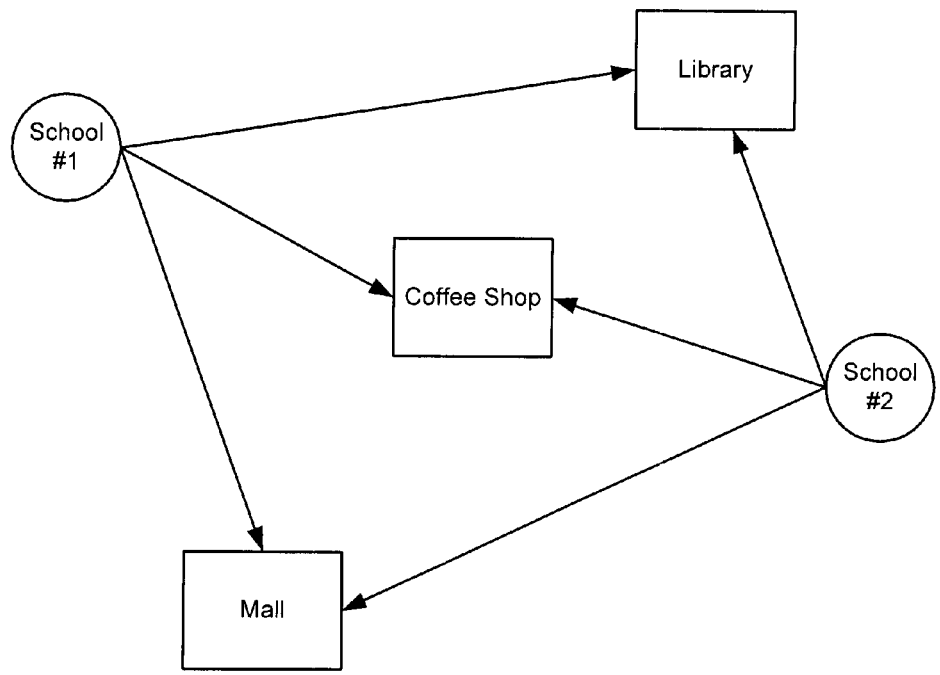

If the buyer and seller attend separate schools but the separate schools are within a predetermined range as specified by the prospective buyer, another option for completing the transaction may be to select an alternative meeting location between the separate schools in order for the buyer and seller to meet and complete the transaction as shown in FIG. 6B. Available locations can be generated based on received input from the school as well as received input from other students, buyers, and sellers. If the seller currently lives at a first school and the buyer currently lives in a second school, then pre-identified locations between the first school and the second school may be identified such as the city library, the local coffee shop, or the mall. Each of these locations may have user recommendation and feedback associated with them to inform others about the characteristics of each location such as ease of access or perceived safety. Once the buyer and seller meet at an agreed upon location, the buyer and seller will complete the transaction in person. The selected location can be selected based on an number of factors such as the location of the seller and prospective buyer, what time of day they wish to meet, and how early/late a location is accessible.

While the previous examples identified location within a school and between school, any predetermined location between a seller and prospective buyer within a predetermined distance can be used.

If the buyer and seller are further than the predetermined distance, the website provides alternative shipping options in which the seller can ship the purchased materials to the buyer. Once a transaction is complete, the website will receive a commission for every transaction made via the website. The website also provides an administration panel to provide an administrator with the ability to add, update, or remove books as well as update price and discounts of books and other order information. The administrator can also manipulate pages or remove higher education institutions from higher education institution lists. The website will also allow the seller to update and alter their selling order through their profiles at any time.

The online textbook exchange apparatus 1 discussed in the above disclosure provide several features that offer distinct advantages. The online textbook exchange apparatus 1 facilitates the process of selling and buying textbooks that would usually occur between students who just finished taking a class and the students that plan to take that class in the consecutive term school term thereby providing the advantage of a more efficient process for sellers to track down the prospective takers of the class next term and for buyers to locate used copies from previous students. An additional advantage is provided by an efficient way to minimize the shipping time and cost since sellers (previous students) would usually be living in the same city as the buyers (prospective students). This process would also grant a better price for the seller as they sell it right after ending their course to those students who most need it. At the same time the buyers are also granted a lower price than they would pay for a used book at a book store for example.

Figure 7:
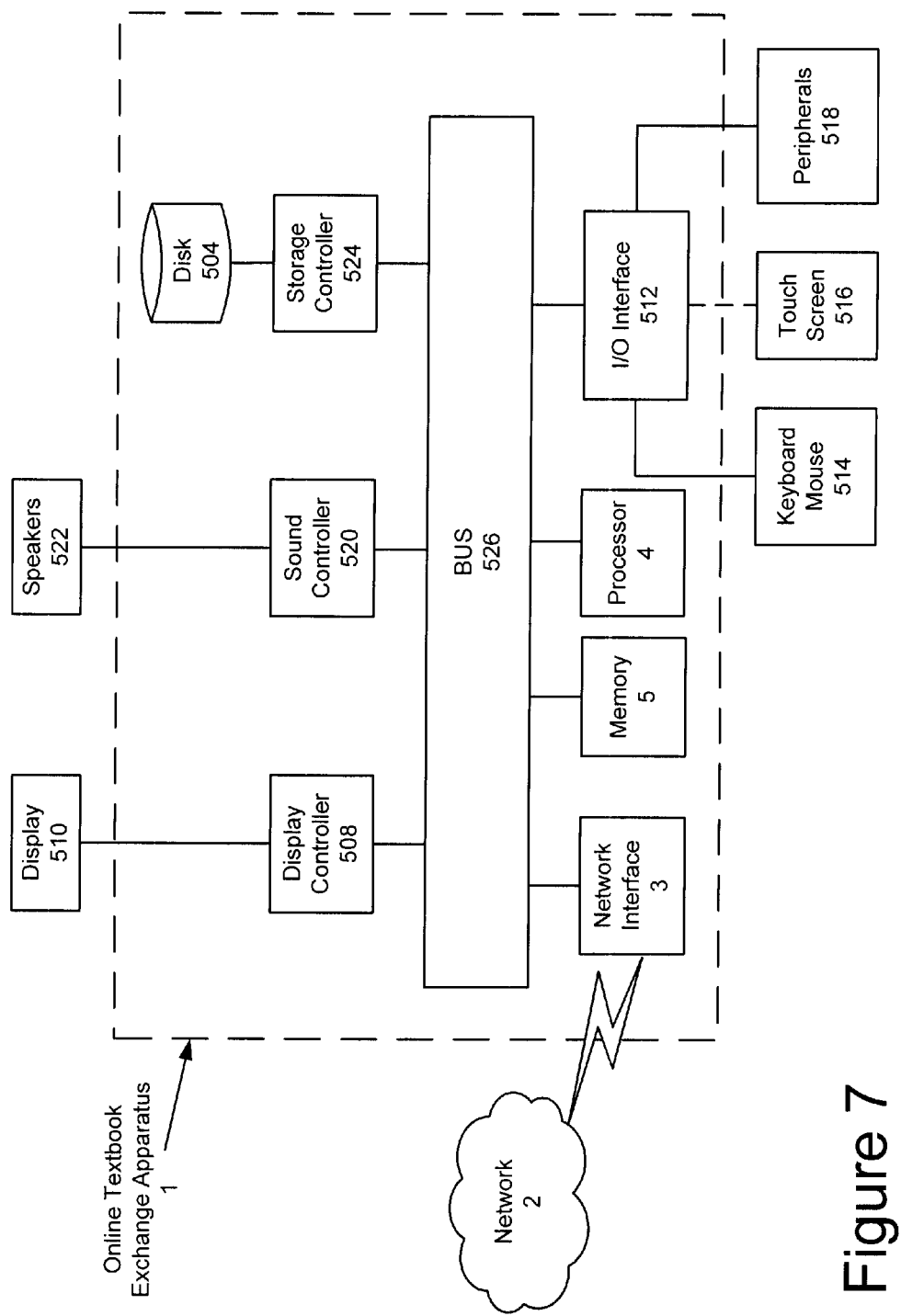
FIG. 7 is a hardware block diagram of an exemplary embodiment of the online textbook exchange apparatus according to an exemplary embodiment.

Next, a hardware description of the online textbook exchange apparatus 1 according to an exemplary embodiment is described with reference to FIG. 7. In FIG. 7, the online textbook exchange apparatus 1 includes a processor 4 which performs the processes described above. The process data and instructions may be stored in memory 5. These processes and instructions may be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the online textbook exchange apparatus 1 communicates, such as a server or computer.

Further, the claimed advancements may be provided as a utility application, background daemon, or a component of an operating system, or a combination thereof, executing in conjunction with processor 4 and an operating systems such as Microsoft Windows 7, UNIX, Solaris, Linux, Apple MAC operating system and other systems known to those skilled in the art.

Processor 4 may be a Xenon or Core processor from Intel of America or an Opteron processor from AMD of America, or may be other processor types that would be recognized by one of ordinary skill in the art. Alternatively, the processor 4 may be implemented on a FPGA, ASIC, PLD or using discrete logic circuits, as one of ordinary skill in the art would recognize. Further the processor 4 may be implemented as multiple processors cooperatively working in parallel to perform the instructions of the inventive process described above.

The online textbook exchange apparatus 1 in FIG. 7 also includes a network interface 3, such as an Intel Ethernet PRO network interface card from Intel Corporation of America for interfacing with network 2. As can be appreciated, the network 2 can be a public network, such as the Internet, or a private network such as a LAN or WAN network, or any combination thereof and can also include PSTN or ISDN sub-networks. The network 2 can also be wired, such as an Ethernet network, or can be wireless such as a cellular network including EDGE, 3-G, and 4-G wireless cellular systems. The wireless network can also be Wi-Fi, Bluetooth, or any other wireless form of communication that is known.

The online textbook exchange apparatus 1 further includes a display controller 508, such as a Nvidia GeForce GTX or Quadro Graphics Adaptor from Nvidia Corporation of America for interfacing with display 510, such as a Hewlett-Packard HPL2445W LCD monitor. A general purpose IO interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett-Packard.

A sound controller 520 is also provided in the online textbook exchange apparatus, such as Sound Blaster X-Fi titanium from Creative, to interface with speaker/microphone 522 or by providing sounds and/or music. The speaker/microphone 522 can also be used to accept dictated words as commands for controlling the online textbook exchange apparatus 1 or for providing location and/or property information with respect to a target property.

The general purpose storage controller 524 connects the storage medium disk 504 with communication bus 526, which may be an ISA, EISA, VESA, PCI, or similar, for interconnecting all of the components of the online textbook exchange apparatus 1. A description of the general features and functionality of the display 510, keyboard and/or mouse 514, as well as the display controller 508, storage controller 524, network interface 3, sound controller 520, and general purpose I/O interface 512 is omitted herein for brevity as those features are known.

Thus, the foregoing discussion discloses and describes merely exemplary embodiments of the present invention. As will be understood by those skilled in the art, the present invention may be embodied in other specific forms without departing from the spirit or essential characteristic thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

What is claimed is:

1. An online textbook exchange apparatus comprising:
a memory;
an interface connected to a network; and
a processor programmed to
receive, via the interface, seller course material information from a seller, the seller course material information including a first set of parameters,
receive, via the interface, a course material survey from the seller,
generate a probability score, using an algorithm, identifying at least a probability that an instructor will allow a prospective buyer to use a course material in a future course, wherein the probability score is generated based on the course material survey,
generate a course material profile containing the first set of parameters and the probability score,
store the course material profile in the memory,
receive, via the interface, buyer course material information from the prospective buyer, the buyer course material information including a second set of parameters,
compare the first set of parameters of each of the one or more of the course material profiles to the second set of parameters to generate a set of comparison results based on a number of matching parameters between the first set of parameters and the second set of parameters, and
transmit, via the interface, one or more course material profiles and the respective probability score for each of the course material profiles to the prospective buyer based on the set of comparison results.

2. The online textbook exchange apparatus of claim 1, wherein the seller course material information includes information identifying a course, a course instructor, and a course material required by the instructor for the course.

3. The online textbook exchange apparatus of claim 1, wherein the probability that the instructor will allow the prospective buyer to use the course material in a future course is based on an instructor response from a set of questions contained in the course material survey, each question having a predetermined value associated with it.

4. The online textbook exchange apparatus of claim 3, wherein the comparison results are generated based on matching the parameters of the first set of parameters and the second set of parameters that include school name, course name, course instructor, as well as a minimum probability score threshold received from the prospective buyer via the interface.

5. The online textbook exchange apparatus of claim 4, wherein the probability score is computed using a geometric mean of a plurality of predetermined values extracted from the course material survey and represented by the following equation:

$$(1+PS)^n = (1+p_1)(1+p_2) \ldots (1+p_n)$$

where PS is the probability score and p is a predetermined value extracted from the n questions contained within the course material survey.

6. The online textbook exchange apparatus of claim 1, wherein the second set of parameters includes at least a school name, a course name, and an instructor name.

7. The online textbook exchange apparatus of claim 6, wherein the first set of parameters includes at least a textbook name, a textbook condition, a university name, a class name, an instructor name, and a major.

8. The online textbook exchange apparatus of claim 7, wherein the textbook condition parameter includes both a written description discussing the condition of a textbook and an uploaded photo of the textbook showing the condition of the textbook.

9. The online textbook exchange apparatus of claim 1, wherein the processor is further programmed to, when the prospective buyer and the seller attend a same school, transmit a list of first predetermined meeting locations within the school.

10. The online textbook exchange apparatus of claim 9, wherein the processor is further programmed to:
when the prospective buyer and seller are within a predetermined geographical distance from one another, transmit a list of second predetermined meeting locations located between the prospective buyer and the seller, and
when the prospective buyer and seller are further than the predetermined geographical distance from one another, transmit a list of shipping options to the prospective buyer.

11. The online textbook exchange apparatus of claim 9, wherein the list of first predetermined meeting location is based on meeting locations received from the school, via the interface, and buyer and seller reviews of predetermined meeting locations.

12. An online textbook exchange method, implemented by an online textbook exchange apparatus, comprising the steps of:
receiving, via an interface of the online textbook exchange apparatus, seller course material information from a seller including at least a first set of parameters,
receiving, via the interface, a course material survey from the seller,
generating a probability score, using an algorithm, identifying at least a probability that an instructor will allow a prospective buyer to use the course material in a future course, wherein the probability score is generated based on the course material survey,
generating a course material profile containing the first set of parameters and the probability score,
storing the course material profile in the memory,
receiving, via the interface, buyer course material information from the prospective buyer, the buyer course material information including a second set of parameters,
comparing, via a processor, the first set of parameters of one or more of the course material profiles to the second set of parameters to generate a set of comparison results, and
transmitting, via the interface, one or more course material profiles and the respective probability score for each of the course material profiles to the prospective buyer based on the set of comparison results.

13. The method of claim 12, wherein the seller course material information includes information identifying a course, a course instructor, and a course material required by the instructor for the course.

14. The method claim 12, wherein the probability that the instructor will allow the prospective buyer to use the course material in a future course is based on an instructor response from a set of questions contained in the course material survey, each question having a predetermined value associated with it.

15. A non-transitory computer-readable storage medium having a computer instruction stored therein that when executed by a computer, cause the computer to perform an online textbook exchange method, comprising the steps of:
receiving seller course material information from a seller including at least a first set of parameters,
receiving a course material survey from the seller,
generating a probability score, using an algorithm, identifying at least a probability that an instructor will allow a prospective buyer to use a course material in a future course, wherein the probability score is generated based on the course material survey,
generating a course material profile containing the first set of parameters and the probability score,
storing the course material profile,
receiving buyer course material information from the prospective buyer, the buyer course material information including a second set of parameters,
comparing the first set of parameters of one or more of the course material profiles to the second set of parameters to generate a set of comparison results, and
transmitting one or more course material profiles and the respective probability score for each of the course material profiles to the prospective buyer based on the set of comparison results.

16. The non-transitory computer-readable storage medium of claim 15, wherein the seller course material information includes information identifying a course, a course instructor, and a course material required by the instructor for the course.

17. The non-transitory computer-readable storage medium claim 15, wherein the probability that the instructor will allow the prospective buyer to use the course material in a future course is based on an instructor response from a set of questions contained in the course material survey, each question having a predetermined value associated with it.

* * * * *